May 7, 1929.     G. M. WRIGHT     1,712,061
MEANS FOR RECEIVING RADIO SIGNALS
Filed Jan. 22, 1925
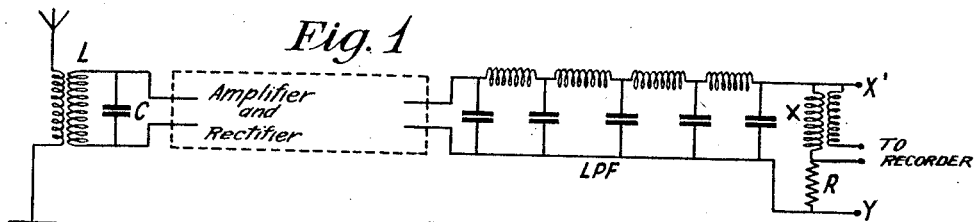
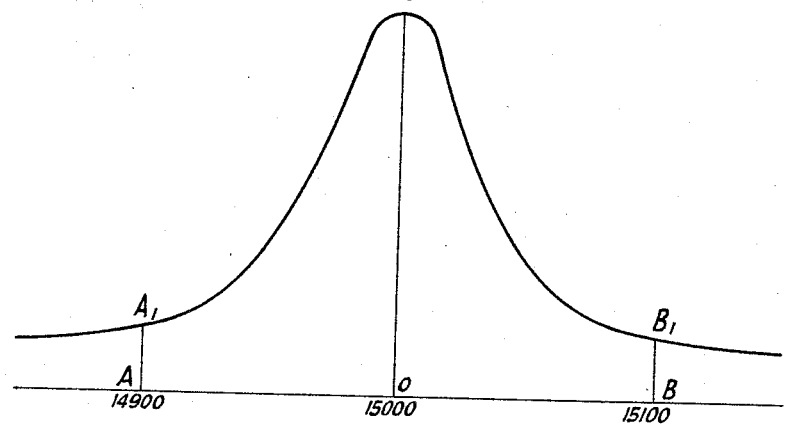
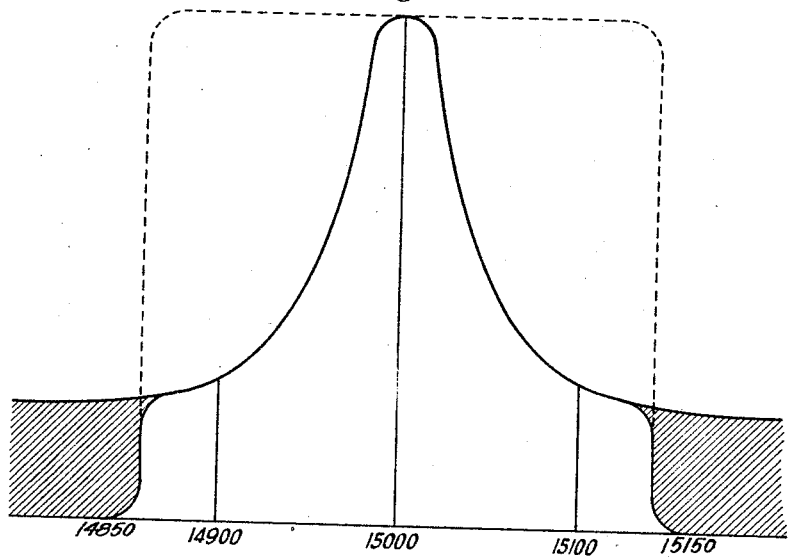
INVENTOR
G. M. WRIGHT
BY
ATTORNEY Patented May 7, 1929.

1,712,061

UNITED STATES PATENT OFFICE.

GEORGE MAURICE WRIGHT, OF CHESTERFIELD, ENGLAND, ASSIGNOR TO RADIO CORPORATION OF AMERICA, A CORPORATION OF DELAWARE.

MEANS FOR RECEIVING RADIO SIGNALS.

Application filed January 22, 1925, Serial No. 3,920, and in Great Britain January 26, 1924.

This invention relates to means for receiving radio signals.

It is well known that the methods of tuning so far proposed result in more or less rounding of the Morse signals and the drawing out of atmospherics into currents of appreciable duration, both of which effects increase the difficulty of reading the received signals.

The object of this invention is (a) to permit of the utilization of the maximum amount of tuning in the receiving circuits, (b) to re-convert the resulting rounded Morse into square signals as originally transmitted, and (c) to re-convert the currents due to atmospherics which have acquired a sustained character into short pulses.

According to this invention unidirectional currents due to incoming signals are passed through two impedances, one impedance being such that the E. M. F. produced in it is proportional to the amplitude of the current giving rise to this E. M. F., while the other is such that the potential produced is at all instants proportional to the rate of change of the amplitude of the current, and a recording device is so arranged that it is operated by the algebraic sum of the potential differences produced across these two impedances.

My invention is illustrated by the accompanying drawing, in which Figure 1 is a diagram of the receiving circuits; Figure 2 is a diagram showing the resonance curve of the circuit L C; and Figure 3 shows the effect of squaring of signals in the recorder connected across X Y and the area of the resonance curve cut out by means of the filtering, as well as the relative duration of maximum amplitude of signals across X' Y as compared with L C.

To now make specific reference to Fig. 1 LC is an oscillatory circuit of very low damping; this circuit may be loosely coupled to an aerial which should have a sufficiently high damping to insure that any appreciable rounding of signals, or hanging on of atmospherics is not produced by tuning; or the signals received on an aerial may be heterodyned, and the resultant beats may be applied to the circuit LC.

The potential variations across the condenser C resulting from the signals and from atmospherics are amplified in the usual manner, particular care being taken that the amplification shall be linear.

After amplification the resulting alternating currents are rectified and the unidirectional pulses so produced are smoothed by means of a low pass filter LPF. The current from LPF is then passed through two impedances of different type, one being a resistance R in which the E. M. F. produced is proportional to the current amplitude giving rise to this E. M. F and the other being an inductance X of negligible resistance in which the potential produced is at all instants proportional to the rate of change of the amplitude of the current.

The recording device is connected directly between the points X' and Y and is operated by the difference in the potential drops produced across these two types of impedance.

It may in some cases be desirable to substitute a transformer or a condenser for the inductance X.

To now refer to Figure 2 which shows the resonance curve of the circuit LC we may consider for the sake of illustration, that the received wave length is 20,000 meters and thus the frequency will be 15,000 cycles per second.

It is assumed that the damping of LC is such that frequencies lying 100 cycles on either side of the tune point are very much reduced as indicated by the ordinates A A' and B B'. If the incoming Morse signals were being received at a speed of 30 words per minute, such sharp resonance, whilst reducing very materially the intensity of interference, would introduce considerable rounding or "hanging-on" of the signals.

Now the square modulation required by Morse signalling is given by the combination, in the receiver, of all the interference tones produced by the rectification of the medley of frequencies sent out when the transmitter is keyed.

When the side frequencies are weakened as at B B' the correct fitting together of the tones to give the original modulation cannot occur and consequently the signals are rounded.

Now it can be shown that if the mixture of interference tones, as distorted by the resonance curve, be passed through an inductance X and resistance R in series as shown in Figure 1, then a relation can be found for the values of resistance and inductance such that the potential drops produced by the various frequencies between X' and Y are restored to the original proportions and consequently the original square modulation of the Morse is reconstructed and would be recorded by any potential-operated recorder connected between X' and Y.

Up to this point it will be apparent that no gain in readability has resulted since the only effect of the circuit has been to restore matters to the condition which existed before the tuning given by the circuit LC was introduced. Now consider the action of the filter LPF. Suppose this filter is arranged to cut off, say, at 150 cycles per second. Then, after rectification, all the interference tones composing the Morse modulation which have frequencies greater than 150 cycles per second will be heavily attenuated by the filter and may be neglected. On the other hand, the frequencies below 150 will be passed by the filter only slightly attenuated. Reverting again to the resonance curve of Figure 2, it will be clear that the tone given by the specimen frequency of 15,100 will be passed by the filter unattenuated. In fact the effect will be to cut out all the area of the resonance curve beyond 150 cycles each side, as shown by the shading of Figure 3.

Very definite limits have therefore been imposed on side frequencies included in the resonance band. If now this composite curve be taken, the side tones which are received by it can be applied in the manner previously described to a combination of a suitable reactance and a resistance, and then all the included frequencies are converted to their initial amplitudes and the maximum squareness of the Morse which can be obtained by the given band will be obtained. The effect is just as though the receiver had a resonance curve of the general squared formation as given by the dotted line of Figure 3.

The width of the included band may be adjusted by varying the cut-off point of the filter.

It is of course clear that the reactance X may be of any character, either an inductance, a mutual inductance, or a capacity. Also by suitable variations in the connections of the recorder it may be connected in series or parallel with the resistance.

Having described my invention what I claim is as follows:—

1. A means for receiving radio oscillations, comprising, an antenna system, a low damped oscillatory circuit loosely coupled thereto, a rectifier for receiving energy from said oscillatory circuit, a filtering means for receiving the unidirectional pulses from said rectifier, means shunted across said filtering means for restoring the received energy to its true wave form as originally transmitted, and a means for recording the said received energy.

2. A means for recording radio oscillations, comprising, a low damped oscillatory circuit loosely coupled with a receiving antenna, a rectifier connected with said oscillatory circuit, a low pass filtering means for receiving the unidirectional pulses from said rectifier, impedance and resistance means shunted across said filter for restoring the wave pulses to their true wave form as originally transmitted, and a means connected at the opposite ends of said impedance and resistance for recording the received signal.

3. A means for recording radio code signal oscillations, comprising, a low damped oscillatory circuit loosely coupled with a high damped receiving means, a means connected with said oscillatory circuit for rectifying the said oscillations, a filter means connected with said rectifying means, said filter means being adapted to smooth the unidirectional pulses of said rectifier, impedance means comprising resistance and inductance shunted across said filtering means, said impedance being adapted to reconvert the received code signals from a rounded form into squared signals as originally transmitted, and a recording means for said received signals connected at opposite points of said impedance.

4. The method of recording received code signals, which comprises, receiving signals, amplifying the signals received, converting the said received signals into a series of unidirectional pulses, filtering said unidirectional pulses so as to smooth the wave form, squaring the wave form of said received signals so as to reshape the same to correspond to their original transmitted form by producing an electromotive force proportional to the current amplitude and producing a second potential proportional at all instants to the rate of change of the current amplitude, selecting the algebraic sum of the differences of the said potentials produced, and producing a record of the received signals from said potential variations.

5. The method of recording received signals, which comprises, receiving signals, amplifying the signals received, rectifying the said received signals so as to convert the same into unidirectional pulses, filtering said unidirectional pulses so as to substantially eliminate interference tones, modifying the signals as filtered so as to reshape the said received signals to a squared form corresponding to the form originally transmitted by producing one electromotive force proportional to the current strength and by producing a second potential proportional at all instants to the rate of change in current amplitude, and producing a record of the signals received from the algebraic sum of the differences of the potentials produced.

6. A means for receiving radio signals, comprising, an antenna, an oscillatory circuit coupled thereto, an amplifying and rectifying means connected with said circuit, a filter means connected with said rectifier, said filter means being adapted to reduce the signal strength of frequencies of one per cent variance from the desired frequency, reactance and resistance means associated with said filter for reshaping the received wave form to correspond to the transmitted form, and means to record the received signals.

GEORGE MAURICE WRIGHT.